United States Patent [19]
Richter

[11] Patent Number: 5,896,023
[45] Date of Patent: Apr. 20, 1999

[54] METHOD FOR CHARGING AN ELECTRIC STORAGE BATTERY

[75] Inventor: Gerolf Richter, Hildesheim, Germany

[73] Assignee: VB Autobatterie GmbH, Hanover, Germany

[21] Appl. No.: 08/947,715

[22] Filed: Oct. 9, 1997

[30] Foreign Application Priority Data

Oct. 18, 1996 [DE] Germany .......................... 196 43 012.7

[51] Int. Cl.[6] ................................................. H02J 7/00
[52] U.S. Cl. ........................... 320/104; 320/162; 322/37; 324/429
[58] Field of Search ........................ 320/104, 162, 320/164; 322/28, 25, 27, 37; 324/429

[56] References Cited

U.S. PATENT DOCUMENTS

| 4,589,073 | 5/1986 | Kidd | 702/58 |
| 4,625,175 | 11/1986 | Smith | 324/430 |
| 5,089,765 | 2/1992 | Yamaguchi | 320/164 |
| 5,151,641 | 9/1992 | Shamoto | 318/762 |
| 5,182,518 | 1/1993 | Stich et al. | 324/511 |
| 5,672,951 | 9/1997 | Shiota | 320/132 |

FOREIGN PATENT DOCUMENTS 20 56 045 B2 of 0000 Germany .
33 30 953 C1 of 0000 Germany .

*Primary Examiner*—Edward H. Tso
*Assistant Examiner*—Gregory J. Toatley, Jr.
*Attorney, Agent, or Firm*—Weiser and Associates P.C.

[57] ABSTRACT

A method for charging an electric storage cell, in particular a lead acid battery, as the starter battery in a motor vehicle, involves the generator voltage being controlled, using the charge state of the accumulator as a controlled variable, the charge state being derived from a measurement of the no-load voltage of the storage cell at the instant of the zero crossing of the current flowing in the storage cell. The measurement of the no-load voltage is carried out within a period of from 0.1 ms to 1 ms after a zero crossing of the current in the storage cell.

7 Claims, No Drawings

METHOD FOR CHARGING AN ELECTRIC STORAGE BATTERY

BACKGROUND OF THE INVENTION

1. Field of the Invention

The invention is related to electric storage batteries, and, in particular, to efficient methods for charging such batteries.

2. Description of the Related Art

The starter batteries in motor vehicles, generally lead acid batteries, are charged by the alternator, acting as a generator, whose voltage is limited by a controller to a preset maximum. The purpose of the controller is to limit the charging voltage applied to the vehicle battery, where possible, to a value below the voltage at commencement of gassing (gassing voltage), so that the battery electrolyte decomposition which starts when the gassing voltage is exceeded, and consequent loss of water and corrosion by deleterious overcharging, are avoided. Maintenance-free operation of vehicle batteries requires the electrical energy in the process of charging to be supplied at a voltage which if possible is below the gassing voltage. In any case, however, recharging of the battery should be achieved as quickly as possible.

Usually the controller is set so as always to limit the charging voltage to a fixed maximum value. Since, however, the gassing voltage of the lead acid battery normally designated as the starter battery depends on the temperature, and the temperature of the battery can fluctuate within wide limits, depending on the season and the operational state of the vehicle, a fixed preset charging voltage maximum does not guarantee recharging in the shortest possible time without gassing under all temperature conditions. To compensate for temperature effects, temperature-dependent electronic circuits have previously been incorporated into the charging circuit between the battery and the alternator.

Such an arrangement is described, for example, in German Patent DE-C-2056045. However, these customary control methods are unsuitable for ensuring the highest possible charge state of the storage battery at all times. Consequently, a great variety of devices for monitoring the charge state of a starter battery had previously been proposed; for example, German Patent DE-C-3330953 describes a device which involves drawing up the current balance in the overall system and thus allowing the exact charge state of the storage cell to be controlled. This known device is complicated, however, and has therefore hitherto been virtually ignored in conventional motor vehicles.

SUMMARY OF THE INVENTION

The object of the invention is to specify a simple charging method which allows the average charge state of the battery to be raised, thus enabling weight savings by virtue of the use of a smaller battery, increasing the battery service life and improving the generator efficiency.

According to the invention, the charge state is determined without complicated current measurements, this being achieved by the no-load voltage of the battery being measured at the instant at which the battery current has a zero crossing.

This is in contrast to the previously customary control of the generator charge voltage whose maximum value hitherto was affected, if at all, by the temperature, the term temperature generally referring solely to the ambient temperature of the generator and only in the most exceptional cases to the battery temperature.

DETAILED DESCRIPTION

According to the invention, the battery voltage during the cyclic charging and discharging operations is determined without the effect of the internal resistance of the battery, inasmuch as a measurement is carried out at I=0, i.e. in the zero crossing of the current or within a very short period after the zero crossing. The no-load voltage thus determined is distinctly different from the open-circuit voltage of a storage cell, since the so-called open-circuit voltage is established only after a while, for example after a few hours, once the diffusion processes, i.e. the equalization processes in the concentration of the electrolyte, are complete.

The no-load voltage is determined at the zero crossing or within a short time after the zero crossing of the current, for example within a period of from 0.1 ms to 1 ms. The no-load voltage thus determined represents, in first approximation, the charge state of the battery and can therefore be used, according to the invention, for controlling the generator voltage.

Advantageously, measurements are carried out both of the no-load voltage at the time of a zero crossing of the current after prior charging and of the value of the voltage during a zero crossing of the current after prior discharging. These different voltage values are stored and a plurality of voltage values thus stored can be processed, for example to give a mean. In the event that no current zero crossing occurs over a prolonged period, for example because the battery is being charged continuously or is continuously connected to a load, a zero crossing of the current is enforced at characteristic intervals, for example of from 0.1 min to 10 min, preferably about 1 min, by the load or the generator being disconnected briefly, for example for a period of 1 ms.

This results in an upper mean (measurements of the no-load voltage during zero crossing after charging) and a lower mean (measurements of the no-load voltage during zero crossing after discharging).

The values thus determined of the no-load voltage are used to influence the controller voltage, the controller voltage being increased, specifically, when both the upper and the lower mean of the no-load voltage are dropping, and the controller voltage being reduced when both the upper and the lower mean of the no-load voltage are rising. In so doing, however, a temperature-dependent upper value of the controller voltage is never exceeded.

In the event that the upper mean and the lower mean of the no-load voltage behave differently, the controller voltage is not changed. The mean of the change in voltage can be selected, for example, as the mean of the latest approximately 10 measuring intervals.

The intrinsic battery open-circuit voltage, which represents the charge state of a battery, is inferred from the upper and lower no-load voltage by the moving average being formed. Continuously forming the average of the upper and lower no-load voltage has the advantage that in the event of the vehicle standing still for a sufficiently long time the genuine open-circuit voltage is measured automatically (upper no-load voltage equals lower no-load voltage) and the system therefore has an error-free reference point.

Advantageously, the randomly distributed signals, which depend on the stochastics of the driving profile, are subjected to correction. Such a correction can be used to compensate for the effect of different acid concentrations, during the charging and discharging states, in the plate pack.

To this end the times for the half-cycles (charging, discharging) and the maximum and minimum values of the voltage amplitudes are first averaged over a prolonged observation period (e.g. 100 measurements). The mean charging and discharging intervals thus obtained, and the mean maximum and minimum voltage amplitudes, form the basis for the value to be expected on average of the acid concentration excess or deficiency in the plate group.

The individual values for the half-cycle time measured for each period and the corresponding voltage amplitude can then be used, with the aid of the corresponding averages derived over a prolonged observation time, to form the correction factors for the controller voltage.

The invention makes it possible for the voltage controller of the generator in the motor vehicle to be acted on in a simple manner, i.e. solely by a voltage measurement, in accordance with the charge state or the change in the charge state of the battery. This ensures that the storage cell is always in a good charge state, thus enabling a battery with a smaller capacity to be fitted and used, which on the one hand leads to savings in weight and on the other hand to savings in costs. More effectively maintaining a good charge state of the storage cell, without the gassing voltage being exceeded in the process, also produces a significant improvement in the service life of the storage cell. Finally, the generator itself is also utilized more effectively, resulting in a higher generator efficiency.

What is claimed is:

1. A method for charging an electric storage cell with a generator, wherein the generator voltage is controlled using the charge state of the storage cell as a controlled variable, the charge state being derived from a measurement of the no-load voltage of the storage cell approximately at a zero crossing of the current flowing in the storage cell.

2. The method of claim 1, wherein the measurement of the no-load voltage is carried out within a period of from 0.1 ms to 1 ms after a zero crossing of the current flowing in the storage cell.

3. The method of claim 2, wherein a charging no-load voltage is measured after charging has been interrupted and a discharging no-load voltage is measured after discharging has been interrupted, wherein a plurality of the measured no-load voltages are processed to generate a mean, wherein:

the generator voltage is increased when the mean of the no-load voltages is dropping;

the generator voltage is decreased when the mean of the no-load voltages is rising; and no change in the generator voltage takes place when the charging and discharging no-load voltages behave differently.

4. The method of claim 3, wherein:

the measurements of the no-load voltage occur at intervals of from about 0.1 to about 10 minutes; and a mean used to calculate changes in the generator voltage is generated from about 10 to 20 measurement intervals.

5. The method of claim 1, wherein a charging no-load voltage is measured after charging has been interrupted and a discharging no-load voltage is measured after discharging has been interrupted, wherein a plurality of the measured no-load voltages are processed to generate a mean, wherein:

the generator voltage is increased when the mean of the no-load voltages is dropping;

the generator voltage is decreased when the mean of the no-load voltages is rising; and no change in the generator voltage takes place when the charging and discharging no-load voltages behave differently.

6. The method of claim 5, wherein:

the measurements of the no-load voltage occur at intervals of from about 0.1 to about 10 minutes; and a mean used to calculate changes in the generator voltage is generated from about 10 to 20 measurement intervals.

7. The method of claim 1, wherein:

the measurements of the no-load voltage occur at intervals of from about 0.1 to about 10 minutes; and a mean used to calculate changes in the generator voltage is generated from about 10 to 20 measurement intervals.

* * * * *

UNITED STATES PATENT AND TRADEMARK OFFICE
CERTIFICATE OF CORRECTION

PATENT NO.   : 5,896,023
DATED        : April 20, 1999
INVENTOR(S)  : Gerolf Richter It is certified that error appears in the above-identified patent and that said Letters Patent are hereby corrected as shown below:

On the title page, item [73] Assignee should read--VB Autobatterie GmbH, Hannover, Germany--.

Signed and Sealed this

Twenty-seventh Day of July, 1999

Attest:

Q. TODD DICKINSON

*Attesting Officer*     *Acting Commissioner of Patents and Trademarks*